United States Patent

[11] 3,627,074

| | | |
|---|---|---|
| [72] | Inventor | Manfred H. Burckhardt |
| | | Waiblingen, Germany |
| [21] | Appl. No. | 823,335 |
| [22] | Filed | May 9, 1969 |
| [45] | Patented | Dec. 14, 1971 |
| [73] | Assignee | Daimler-Benz Aktiengesellschaft |
| | | Stuttgart-Unterturkheim, Germany |
| [32] | Priority | May 10, 1968 |
| [33] | | Germany |
| [31] | | P 17 55 454.0 |

[54] INSTALLATION FOR THE EQUALIZATION OF EXCESSIVE ACCELERATIONS IN MOTOR VEHICLES
17 Claims, 3 Drawing Figs.

[52] U.S. Cl. .................................................. 180/82,
192/3 TR, 303/21 R
[51] Int. Cl. ..................................................... B60k 33/00
[50] Field of Search .......................................... 180/82, 1,
105; 303/21, 21 A, 21 B; 188/181; 192/3

[56] References Cited
UNITED STATES PATENTS

| | | | |
|---|---|---|---|
| 2,332,584 | 10/1943 | McCune................... | 303/21 |
| 3,165,180 | 1/1965 | Inderau.................... | 188/181 |
| 3,311,201 | 3/1967 | Frishauf................... | 180/1 |
| 3,400,776 | 9/1968 | Smith....................... | 303/21 |
| 3,469,662 | 9/1969 | Dewar...................... | 188/181 |
| 3,503,654 | 3/1970 | Stamm...................... | 303/21 |

*Primary Examiner*—Kenneth H. Betts
*Attorney*—Craig, Antonelli & Hill

ABSTRACT: An installation in which a pulse transmitter or a set of pulse transmitters is adapted to be connected either with a brake-force control device or with a correcting member reducing the engine output, depending on whether or not the gas pedal or brake pedal is depressed.

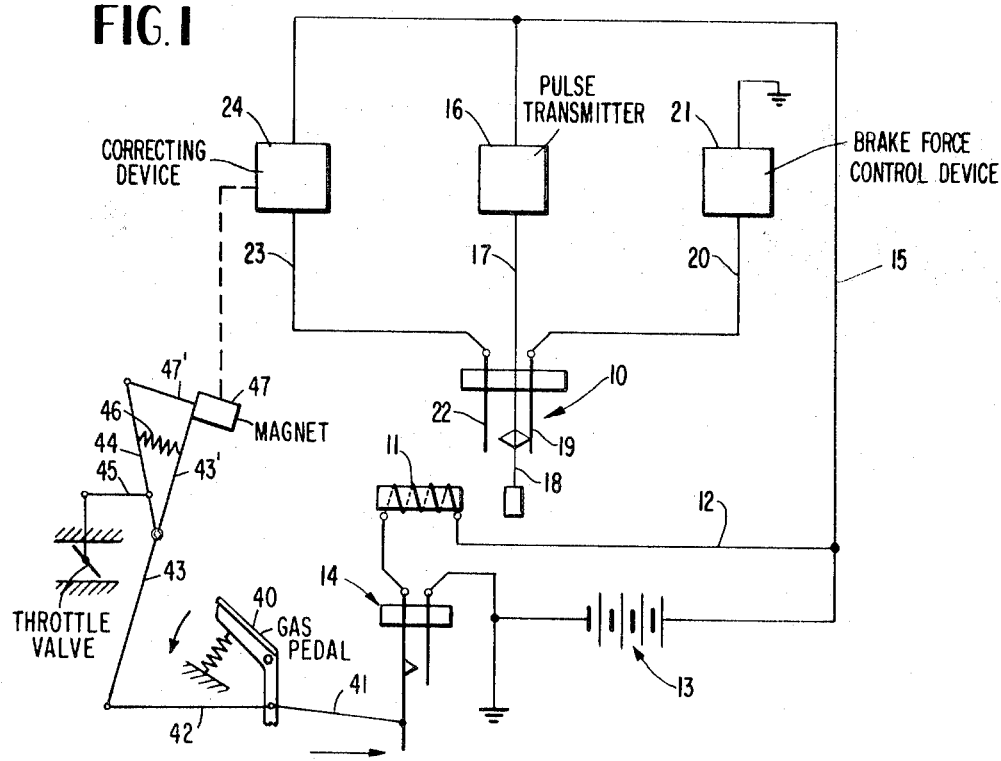
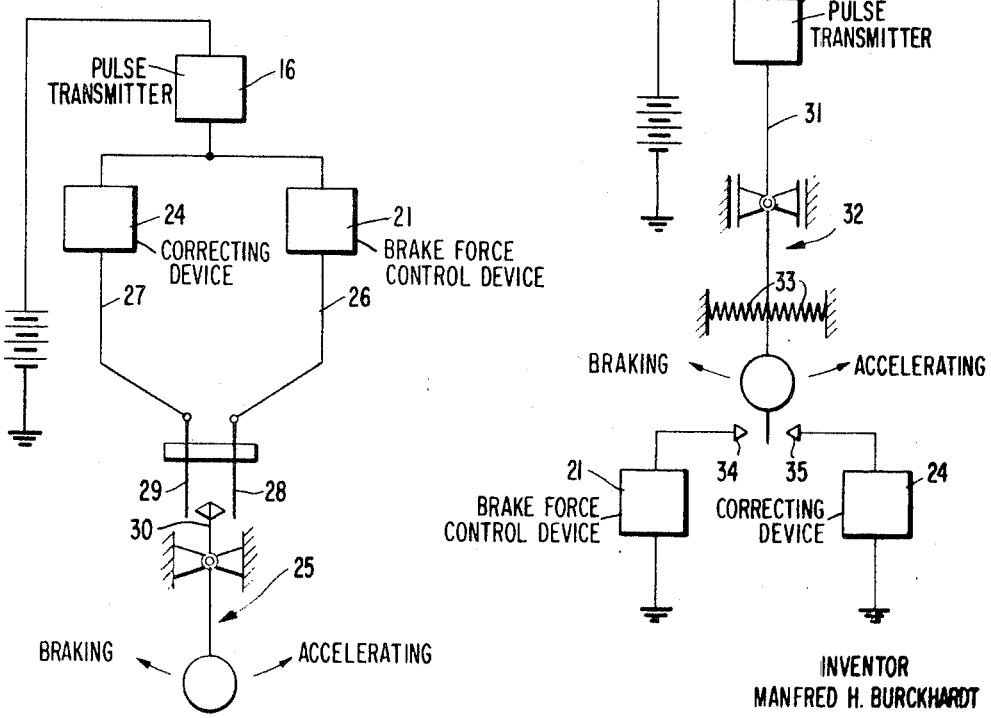
INVENTOR
MANFRED H. BURCKHARDT
BY Craig, Antonelli, Stewart & Hill
ATTORNEYS

INSTALLATION FOR THE EQUALIZATION OF EXCESSIVE ACCELERATIONS IN MOTOR VEHICLES

The present invention relates to an installation for preventing the spinning of the driving wheels of motor vehicles which are driven by way of a transmission, especially an automatically shifting transmission, from an internal combustion engine controlled in its output by an actuating member by means of a control member, whereby a pulse transmitter responding to rotational accelerations is coordinated to the drive connection between transmission and driven wheels which is operatively connected with a correcting member that, in its turn, is associated with the linkage between the actuating member—for example, the drive pedal—and the control member—for example, the throttle valve—and which during pulse initiation upon exceeding a possibly adjustable acceleration engages into this linkage in an output-reducing sense.

In motor vehicles with an internal combustion engine having a high torque, the driven wheels occasionally tend to spin. This spinning may occur, for example, when the actuation of the drive pedal or of the clutch does not take place quite as carefully as would require as such the high-torque engine. The same effect may also occur during the drive if the vehicle, for example, during the acceleration, reaches another, more smooth or more slippery road surface. In all of these cases, not only a loss in forward thrust is connected with this spinning, i.e., the acceleration is lost, but the vehicle may also start to skid by reason of the absence of the lateral guide force. In order to equalize or prevent this, the installation described hereinabove has already been proposed in the prior art. On the other hand, the equalization of negative accelerations has been proposed already by means of so-called brake slippage regulators or control devices.

The present invention is now based on the aim to realize a combination of both installations. Particularly with those motor vehicles interesting in connection therewith for very high demands, such a combination appears appropriate.

The underlying problems are solved by the present invention in the installations of the aforementioned type that with the existence of a brake-slippage control mechanism operable in dependence on the rotational acceleration, the same pulse transmitter or transmitters are provided for both installations and that the pulse transmitter or transmitters is or are adapted to be selectively and effectively connected either with the brake-slippage control device or with the correcting member depending on the selected drive condition—braking or acceleration. Preferred is thereby a solution according to which the line from the pulse transmitter or transmitters is extended to a changeover switch and is adapted to be selectively connected by means of this changeover switch with either the correcting member or with the brake-slippage control device.

The present invention offers the advantage that one can operate with one pulse transmitter or with one set of pulse transmitters for both installations. The latter is necessary, for example, when the pulse transmitters are arranged in the hubs of the wheels. Consequently, the present invention results in a considerable simplification in the construction. The type and construction of the pulse transmitter or transmitters themselves form no part of the present invention, the same being also true for the construction of the correcting member which may be of any well-known construction. However, it is also within the frame of the present invention to realize the switching-over either directly or indirectly, for example, by way of a relay.

In one type of construction according to the present invention, a possibly indirectly actuated changeover switch is coordinated to the actuation member—for example, to the drive pedal—which connects the pulse transmitter or transmitters in case of a nonactuated actuating member, with the brake-slippage control device and upon actuation of the actuating member with the correcting member. In another type of construction of the present invention, a possibly indirectly actuated changeover switch is coordinated to the brake pedal which connects the pulse transmitter or transmitters in case of nonactuated brake pedal, with the correcting member and upon the actuation of the brake pedal, with the brake-slippage control device.

Additionally, it is also within the purview of the present invention to realize this switching-over again in dependence on an acceleration, for example, by a pendulum which responds to the deceleration during braking and to the acceleration when giving gas. Such types of pendulum arrangement are known, per se, and also do not form any part of the present invention. Furthermore, it is also feasibly within the scope of the present invention to construct the changeover switch in the manner of a snap- or toggle-type switch in order that a certain stability in the two switch positions is achieved.

Accordingly, it is an object of the present invention to provide an installation for the compensation of excessive, positive and negative accelerations in motor vehicles which eliminates by simple means the aforementioned shortcomings and drawbacks encountered in the prior art.

Another object of the present invention resides in an installation for preventing spinning of the wheels during excessive accelerations and locking of the wheels during braking which is simple in construction, utilizes relatively few parts, and assures operational safety.

These and further objects, features, and advantages of the present invention will become more obvious from the following description when taken in connection with the accompanying drawing, which shows, for purposes of illustration only, several embodiments in accordance with the present invention, and wherein:

FIG. 1 is a schematic wiring diagram of a changeover installation actuated by the gas pedal in accordance with the present invention; and FIGS. 2 and 3 are schematic wiring diagrams of two different embodiments of automatically operating changeover installations in accordance with the present invention.

Referring now to the drawing, wherein like reference numerals are used throughout the various views to designate like parts, and more particularly to FIG. 1, a switching or changeover relay generally designated by reference numeral 10 is arranged at an appropriate place in the vehicle, whose energizing coil 11 is connected, on the one hand, by way of line 12 with the battery 13 and, on the other, by way of a switch generally designated by reference numeral 14 with the ground. The switch 14 is operatively associated in a conventional manner with the gas or drive pedal of the vehicle (not shown). The arrangement is thereby conventionally made in such a manner that the switch 14 open with nonactuated drive-pedal, whereas it is closed upon actuation of the drive pedal. The batter 13 is connected by way of a line 15 with the pulse transmitter 16 which may be constructed and arranged in the manner indicated above and may be of any known type, again forming no part of the present invention. As pointed out above, normally one pulse transmitter each is coordinated to a respective wheel of the vehicle, whereby the outputs are combined in a conventional manner to achieve the desired control of the brake force. However, for the sake of simplicity, and since the pulse transmitters, as such, and their interrelationship forms no part of the present invention, only a single pulse transmitter 16 is shown and described herein.

A line 17 leads from this pulse-transmitter 16—or from an entire set of pulse transmitters—to the center contact 18 of the switching relay generally designated by reference numeral 10. In the illustrated, deenergized position, this center contact 18 is electrically connected with the contact 19 which leads by way of a line 20 to the brake-force control-device 21 of any conventional construction. The other contact 22 of the switching relay 10 is connected by way of a line 23 with the correcting member 24 whose arrangement and construction is also conventional and therefore forms no part of the present invention. As is known, the correcting member 24 has the purpose to engage into the linkage between the drive pedal and the output control or regulating member of the engine—for example, the throttle valve—in an output reducing sense, upon pulse transmission. Since such control arrangement is known as such in the prior art and forms no part of the present invention, a detailed description thereof is dispensed with herein.

Consequently, in the illustrated position, the pulse transmitter 16 is connected at all times with the brake-force control-device 21. If an excessive deceleration therefore occurs in this condition—for example, during excessive braking—then a pulse is produced in the pulse transmitter 16, which is then converted in the brake-force control device in the manner already described above and is utilized for the control of the brake pressure in a known, conventional manner.

If the drive pedal is depressed from the illustrated position for the purpose of acceleration—for example, during starting—then the switch 14 is closed and the energizing coil 11 of the switching relay 10 is energized. As a result thereof, the center contact 18 is lifted off from the contact 19 and is brought into engagement with the contact 22. During this driving condition, the brake-force control-device 21 is therefore disengaged, and the pulse transmitter 16 is connected by way of the lines 17 and 23 with the correcting device 24. This position is maintained for such length of time as the switch 14 remains closed by actuation of the drive pedal. If now, as a result of the high torque of the engine, a spinning or slipping of the wheels occurs, then the pulse produced thereby in the pulse transmitter 16 is no longer fed to the brake-force control device but instead to the correcting device 24 which engages into the output control of the engine in an output reducing sense, i.e., takes away the gas.

The wheels thereby again receive ground or road contact and the dangerous spinning is prevented.

If the driver releases the drive pedal, in order to actuate, for example, the brake (not shown), then the switch 14 opens and the switching relay 10 falls back automatically into the illustrated position, i.e., the pulse transmitter 16 is then again connected with the brake-force control-device 21.

Of course, the switch 14 can also be operatively connected with the brake pedal. The operation of the arrangement and its basic construction remains the same. However, in that case, the line 20 does not lead from contact 19 to the brake-force control-device 21 but instead to the correcting member 24 and, vice versa, the line 23 from the contact 22 to the brake-force control-device 21.

According to FIG. 2, the switching-over place in dependence on a pendulum 25 of any conventional construction which responds to the acceleration or deceleration of the vehicle. The pulse transmitter or transmitters 16 are then connected both with the brake-force control-device 21 as also with the correcting member 24. The ground connections of the brake-force control-device 21 and of the correcting device 24 lead by way of the lines 26 and 27 to two external or outer contacts 28 and 29 which have a predetermined distance from the center contact 30. The latter is controlled by the pendulum 25 so that, depending on the deflection of the pendulum 25 during braking, for example, the brake-force control-device 21 is connected by way of the line 26 and the contacts 28 and 30 with the ground whereas during acceleration of the vehicle, the correcting member 24 is connected with ground by way of the line 27 and the contacts 29 and 30. As to the rest, the operation is the same as that described in connection with FIG. 1.

In the arrangement according to FIG. 3, a line leads from the pulse transmitter or transmitters 16 to the pendulum generally designated by reference numeral 32 which operates in the same manner as in the arrangement according to FIG. 2, but which is suspended insulated in the vehicle. Return springs 33 and possibly also conventional damping devices (not illustrated) are coordinated to the pendulum 32—as also to the previously described pendulum 25. The pendulum 32 thus forms the center contact for the two contacts 34 and 35 whereby the former is connected with the brake-force control-device 21 and the latter with the correcting member 24. The operation corresponds to the arrangement described above. Depending on the driving condition—braking or acceleration—an eventually produced pulse is fed either to the brake-force control device or to the correcting member.

While I have shown and described several embodiments in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are within the scope of those skilled in the art.

I claim:

1. An installation for preventing the spinning of the driving wheels of motor vehicles which are driven by way of a transmission from an internal combustion engine controlled in its output from an actuating member by means of an engine control member, in which a pulse transmitter means responding to rotational acceleration is coordinated to the drive connection between transmission and driving wheels and which further includes linkage means between the actuating member and the engine control member, and correcting means adapted to be operatively connected with said pulse transmitter means and operable to engage in said linkage means in an output reducing sense upon pulse transmission when exceeding a predetermined acceleration, characterized by brake-slippage control means, said pulse transmitter means being used for both said brake slippage control means as well as said correcting means, and means for establishing an effective alternative connection for said pulse transmitter means with either said brake-slippage control means or with said correcting means in dependence on the selected driving condition.

2. An installation according to claim 1, wherein said actuating member is the drive pedal.

3. An installation according to claim 2, wherein said control member is a throttle valve.

4. An installation according to claim 3, wherein said transmission is an automatically shifting transmission.

5. An installation according to claim 1, wherein said driving conditions consist of braking and acceleration.

6. An installation according to claim 1, characterized by line means connected with the pulse transmitter means and adapted to be selectively connected with the correcting means or the brake-slippage control means by a switch means.

7. An installation according to claim 6, characterized in that the switch means is operatively connected with the actuating member and effectively connects the pulse transmitter means, with nonactuated actuating member, with the brake slippage control means and upon actuation of the actuating member with the correcting means.

8. An installation according to claim 7, characterized in that the actuating member is a drive pedal.

9. An installation according to claim 8, characterized in that the switch means is indirectly actuated.

10. An installation according to claim 6, characterized in that the switch means is operatively connected with a brake pedal, said switch means effectively connecting the pulse transmitter means, with nonactuated brake pedal, with the correcting means and with an actuated brake pedal with the brake-slippage control means.

11. An installation according to claim 6, characterized in that a pendulum means responding to the vehicle acceleration is provided as switch vehicle acceleration is provided as switch means, said pendulum means effectively connecting the pulse transmitter means selectively with the brake-slippage control means or with the correcting means corresponding to the existing drive condition.

12. An installation according to claim 11, characterized in that the pendulum means directly connects the pulse transmitter means with the brake-slippage control means or the correcting means.

13. An installation according to claim 12, characterized in that said pendulum means indirectly connects the pulse transmitter means selectively with the brake-slippage control means or with the correcting means.

14. An installation according to claim 1, characterized in that a switch means is operatively connected with the actuating member and effectively connects the pulse transmitter means with nonactuated actuating member, with the brake-slippage control means and upon actuation of the actuating member with the correcting means.

15. An installation according to claim 14, characterized in that the actuating member is a drive pedal.

16. An installation according to claim 1, characterized in that a switch means is operatively connected with a brake pedal, said switch means effectively connecting the pulse transmitter means, with nonactuated brake pedal, with the correcting means and with an actuated brake pedal with the brake-slippage control means.

17. An installation according to claim 1, characterized in that a pendulum means responding to the vehicle acceleration is provided as switch means, said pendulum means effectively connecting the pulse transmitter means selectively with the brake-slippage control means or with the correcting means corresponding to the existing drive condition.

* * * * *